United States Patent [19]

De Lancey

[11] 3,912,059

[45] Oct. 14, 1975

[54] CENTRIFUGAL CLUTCH
[75] Inventor: Warren H. De Lancey, Elyria, Ohio
[73] Assignee: Pioneer Products Company, Elyria, Ohio
[22] Filed: Mar. 15, 1974
[21] Appl. No.: 451,478

[52] U.S. Cl. .......... 192/105 CD; 192/110 B; 64/1 R; 417/319
[51] Int. Cl.² ........................................ F16D 43/14
[58] Field of Search 192/105 CD, 105 CE, 105 BA, 192/105 BB, 103 B, 110 B, 110 R, 74, 75, 76

[56] References Cited
UNITED STATES PATENTS

| | | | |
|---|---|---|---|
| 846,193 | 3/1907 | Fellows | 192/105 CD |
| 1,196,015 | 8/1916 | Nelson | 192/103 B |
| 1,692,703 | 11/1928 | Rigolage | 192/105 CD |
| 3,552,904 | 1/1971 | Lancey | 192/105 CD |

FOREIGN PATENTS OR APPLICATIONS

| | | | |
|---|---|---|---|
| 1,123,545 | 6/1956 | France | 192/105 CD |

Primary Examiner—Benjamin W. Wyche
Attorney, Agent, or Firm—Cullen, Settle, Sloman & Cantor

[57] ABSTRACT

A centrifugal clutch has a drive plate and a hub to receive a drive shaft. A pair of oppositely arranged weights at their one ends are pivotally mounted upon said plate with their opposite ends biased inwardly. Their outer edges are arcuate. A drum with friction lining loosely surrounds the plate and weights and includes an axial hub journalled on and in cooperating registry with the plate hub. A flanged plug is anchored in one hub and retainingly engages the other hub to prevent relative end-wise movements. A cap overlies the plug and the ends of the hubs and is secured thereto to seal off the interior of the clutch from oil, dirt and moisture.

7 Claims, 9 Drawing Figures

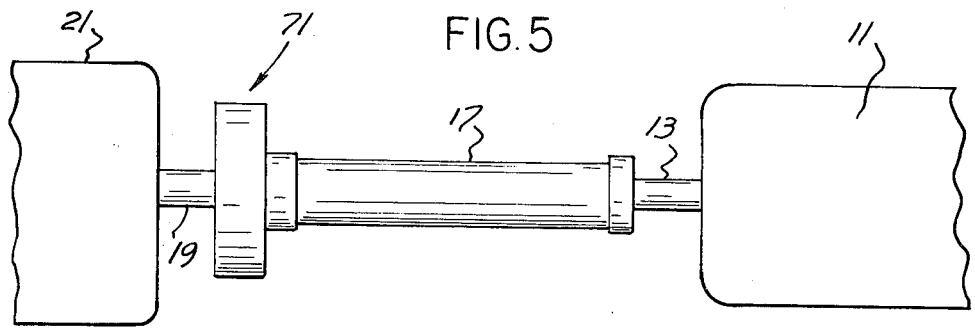
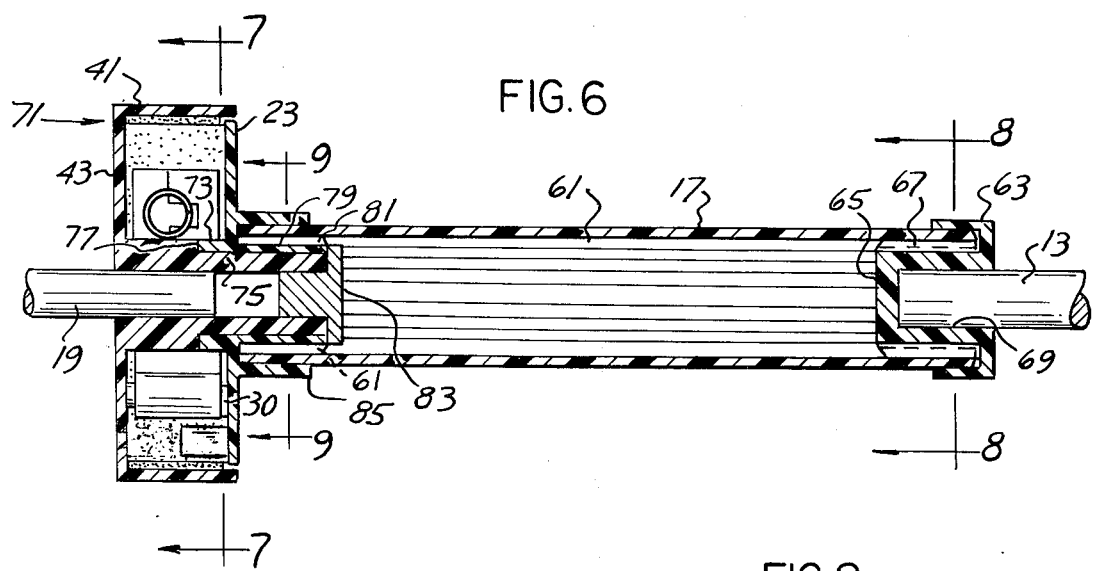
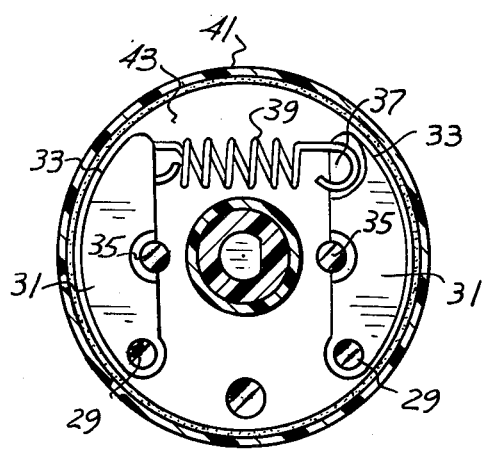
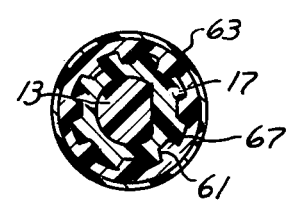
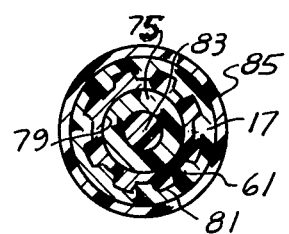

CENTRIFUGAL CLUTCH

BACKGROUND OF THE INVENTION

Centrifugal clutches have heretofore been employed for the purpose of establishing a drive and driven relationship between the output shaft of a motor and the input shaft of an oil pump. Examples of these are shown in my earlier issued U.S. Pat. Nos. 3,693,771 and 3,552,904. Further examples of this type of centrifugal clutch may be found in U.S. Pat. Nos. 3,197,004 and 3,224,541, as well as U.S. Pat. No. 846,193 of 1907.

It has been discovered heretofore that in the use of this type of clutch for transmitting drive from a motor to the shaft of an oil pump, that any leakage of oil from the pump or dirt or moisture from the atmosphere, could enter the interior of the centrifugal clutch and destroy its efficiency.

It is an object of the present invention to provide an improved assembly between the hubs of the drive and driven members of a centrifugal clutch such as to provide means for securing and journalling same with respect to each other against end-wise movement and at the same time, to seal the interior of the clutch assembly from exterior dirt, moisture or oil.

In earlier constructions where a washer has been employed for interconnecting the hubs of the respective parts against relative axial movement, there has been an axial aperture into the interior of the clutch. Any escaping oil from the pump could enter the clutch or the bearing surfaces and render the centrifugal clutch inoperative.

It is a further object to provide an improved hub assembly for the drive and driven members of a centrifugal clutch wherein, the hubs are journalled with respect to each other, anchored with respect to end-wise movement relatively and at the same time, sealed from outside dirt, moisture or oil.

These and other objects will be seen from the following specification and claims in conjunction with the appended drawings.

THE DRAWINGS

FIG. 5 is a fragmentary schematic view of the arrangement between an output shaft on a motor and the input shaft of an oil pump with the present centrifugal clutch and connection interposed in a relationship reverse from that shown in FIG. 1.

FIG. 6 is a longitudinal section on an increased scale of the centrifugal clutch assembly of FIG. 5 and the drive connections therefore.

FIG. 7 is a section taken in the direction of arrows 7—7 of FIG. 6.

FIG. 8 is a section taken in the direction of arrows 8—8 of FIG. 6.

FIG. 9 is a section taken in the direction of arrows 9—9 of FIG. 6.

it will be understood that the above drawings illustrate merely a preferred embodiment of the invention, and that other embodiments are contemplated within the scope of the claims hereafter set forth.

DETAILED DESCRIPTION OF THE INVENTION

Figure 1:
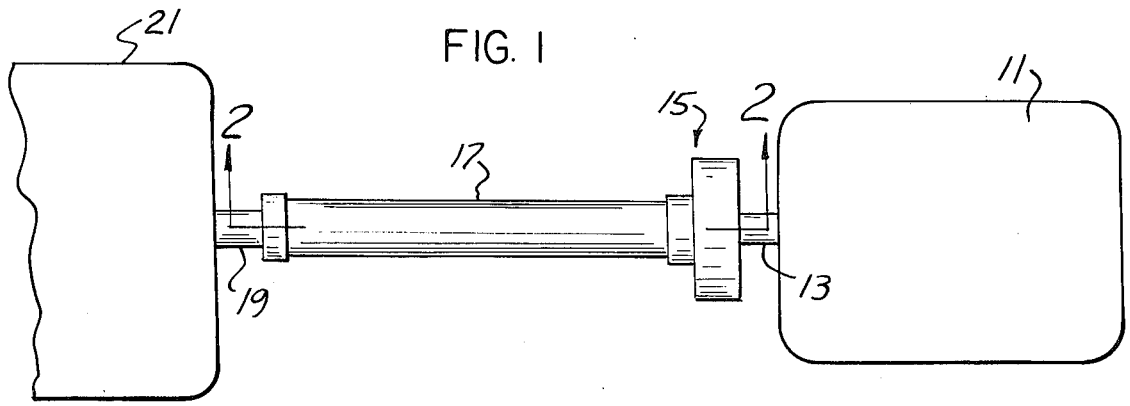
FIG. 1 is a fragmentary schematic elevational view showing the relationship between a motor and an oil pump with the present centrifugal clutch and connector interposed.

Referring to the drawings, one embodiment of the invention is shown in FIGS. 1 through 4. In FIG. 1, motor 11 is schematically shown having an output shaft 13 which through the present centrifugal clutch 15 and connector 17, drivingly engages the remote input shaft 19 of oil pump 21, fragmentarily and schematically shown. In this environment, the present centrifugal clutch 15 and coupling 17 is shown on an increased scale in FIG. 2.

Figure 3:
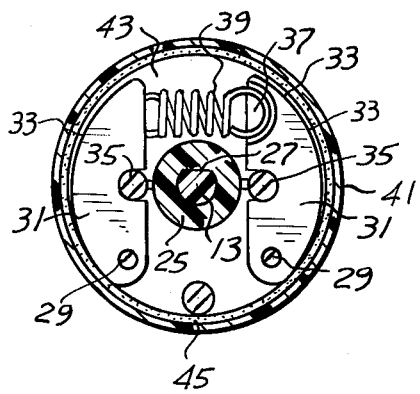
FIG. 3 is a section taken in the direction of arrows 3—3 of FIG. 2.
Figure 4:
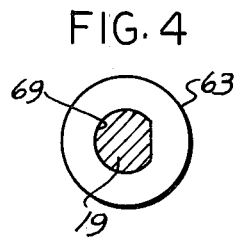
FIG. 4 is a section taken in the direction of arrows 4—4 of FIG. 2.

The present centrifugal clutch includes a drive member having circular plate 23 having a central laterally elongated hub 25 adapted to receive motor drive shaft 13, fragmentarily shown. As shown in FIG. 3, said hub has a flattened portion at 27 for a drive relation with shaft 13.

Figure 2:
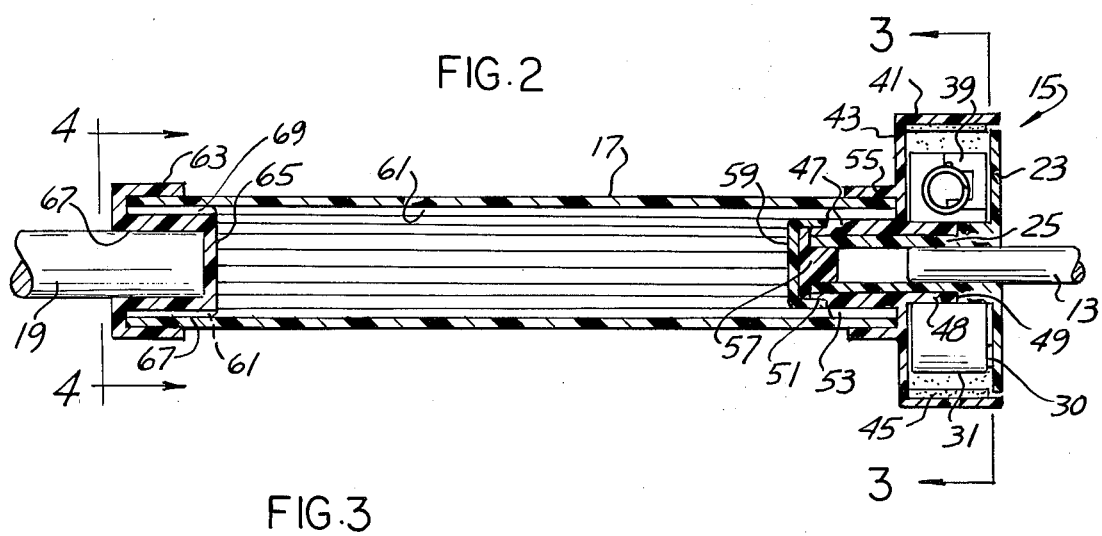
FIG. 2 is a longitudinal section on an increased scale of the centrifugal clutch assembly and drive connections between the motor and pump, shown in FIG. 1.

As shown in FIGS. 2 and 3, mounted upon one side of plate 23 are a pair of spaced pivot posts 29 which terminate at the plate 23 in the spacers 30. In the illustrative embodiment, the plate 23, hub 25 and posts 29 are of a plastic material. A pair of oppositely arranged metallic weights 31 are pivotally mounted at their one ends upon the respective posts 29. Their outer surfaces are arcuate as at 33, adapted when projected outwardly from the position shown in FIG. 3 by centrifugal force for drive engagement with the lining 45 of the drum 41.

A pair of stops 35 also project outwardly from plate 23 as a part thereof and to limit movement of the weights 31 when biased inwardly by the coil spring 39. Each of the weights at their opposite ends and from opposite sides are formed with bosses 37 to anchor the looped ends of tension spring 39.

The present centrifugal clutch has a driven member which includes a drum 41, and a radial end surface 43 which terminates in the laterally directed external hub 47 outwardly of said end surface and the inwardly directed hub 48.

Said drum hub 47, 48 is mounted and journalled on plate hub 25 with the inner end of hub 48 engaging a corresponding shoulder 49 on the plate hub 25, limiting inward movement of hub 48. The external hub 47 has a hub end or extension 51 of reduced diameter which goes to the outer end of the plate hub in registry therewith, FIG. 2.

Arranged around the external hub 47 is a series of splines 53 spaced inwardly of and parallel to an annular shroud 55 which projects from wall 43 of said drum. The flanged plug 57 is snugly and frictionally projected into the end of hub 25 and secured therein. Its outer flanged portion operatively and retainingly engages the outer end hub portion 51 of the drum as a means of anchoring the two hubs together against relative end-wise movements, but permitting relative rotation.

Cap 59 is snugly projected over the plug and over the end of the drum flange 51 for sealing off the interior of the centrifugal clutch from any outside dirt, mositure or oil.

In the illustration, FIG. 2, the connector 17, of plastic or other material, has along its interior surface a series of longitudinal spaced splines 61. When one end of the connector is projected over the splined portion 53 of the drum and into the shroud 55, there is provided a secure driven relation between said drum and connector.

Accordingly, when a predetermined speed has been achieved with respect to the shaft 13 and the corresponding weights 31, they will pivot outwardly by centrifugal force against the action of spring 39 until their exterior arcuate surfaces 33 drivingly engage the internal lining 45 of the drum to initiate rotation thereof. One illustrative speed, for example, may be 2,500 R.P.M. In other words, the drum does not begin to rotate until the motor has reached proper driving speed.

The other end of the coupling 17 has secured thereover a connector cap 63 having an internal boss 65 whose bore 67 is adapted to drivingly engage one end of the input shaft 19 of the oil pump shown in FIG. 1. Said boss has an exterior spline 69, adapted for cooperative registry with the internal spline 61 on coupling 17, FIG. 2.

MODIFICATION

FIGS. 5 through 9 show a modificatiton of the present invention wherein, the centrifugal clutch 71 corresponding to clutch 15 of FIG. 1 is arranged at the opposite end of coupling 17. In this arrangment, the output shaft 13 of the motor drives coupling 17, which in turn, drives plate 23 of centrifugal clutch 71 for operation of the clutch in the same manner described with respect to centrifugal clutch 15 above.

In this construction as shown in more detail in the longitudinal section, FIG. 6, certain parts are the same and their description is not repeated. For example, the drive member including plate 23 pivotally mounts the weights 31, FIG. 7, in the same manner as above described with respect to FIG. 3. The main differences are in the construction of the hubs for the drive member and the drum 41.

The drive plate 23 includes an inwardly directed axial hub 73 as well as an outwardly directed hub 79, both of which are journalled upon the axially extending hub 75, which projects from the radial wall 43 of drum 41. In this assembly, FIG. 6, the inner end of the interior hub 73 registers with shoulder 77 of drum hub 75, limiting relative movement in one direction. The outer ends of hub 75 and 79 are in registry and are retained against relative axial movement by the flange plug 83, which is snugly and frictionally projected and retained within drum hub 75. Its outer flange portion retainingly engages the external hub 79 of plate 23 for preventing relative axial movement between the respective hubs and to complete the assembly journalling of the drive and driven members of centrifugal clutch 71.

In this case, the plate hub 79 has on the exterior thereof a longitudinal spline 81 arranged therearound, adapted to cooperatively register with the internal spline 61 of connector 17. This connector projects into the annular shroud 85 upon the exterior of plate 83, outwardly of its hub 79.

In this construction the opposite end of connector 17 has a similar cap 63 whose interal boss 65 is apertured as at 69 to drivingly receive shaft 13 from motor 11, FIG. 5. Should there be any oil leakage from pump 21, FIG. 5, the exterior radial wall 43 of the drum adjacent said pump will prevent entry of such oil to the interior of the centrifugal clutch assembly, FIG. 6.

The respective drive and driven elements of the centrifugal clutch 71 are held together and retained against axial movement by the flanged friction plug 83.

Having described my invention, reference should now be had to the following claims.

I claim:

1. In a centrifugal clutch, a drive member including a circular plate having a central laterally extending hub adapted to receive a drive shaft;
   a pair of oppositely arranged weights at their one ends pivoted on said plate, their outer working edges being arcuate;
   a spring interconnecting the other ends of said weights;
   stops on said plate limiting inward release positioning of said weights;
   a driven member including a drum having a friction lining loosely surrounding and spaced from said plate and weights, said drum having a radial wall terminating in an axial hub journalled on said plate hub;
   said drum hub extending inwardly of said radial wall into registry with a stop shoulder on the plate hub, and extending outwardly of said radial wall to the end of the plate hub;
   a plug frictionally projected into and anchored within the end of said plate hub and having an enlarged radial flange retainingly engaging the drum hub against axial movement relative to said plate hub, said plug closing off the interior of the plate hub, and said plug flange closing off the interior of said drum hub.

2. In the clutch of claim 1, a cap overlying said plug and snugly and frictionally anchored over the free end of said drum hub for sealing off the interior of said clutch from exterior oil, dirt and moisture.

3. In the centrifugal clutch of claim 2, a spline on and around a portion of the drum hub; and an annular shroud on said drum spaced outwardly of said spline; and an elongated internally splined connector projected into said shroud and over said splined hub.

4. In the centrifugal clutch of claim 3, said connector at its other end having an uneven axial aperture adapted to drivingly receive the shaft of an oil pump.

5. In a centrifugal clutch having a drive member, including a circular plate having a central laterally extending hub adapted to receive a drive means;
   a pair of oppositely arranged weights at their one ends pivoted upon said plate, their outer working edges being arcuate;
   a spring interconnecting the other ends of the weights;
   stops on said plate limiting inward release positioning of said weights; a driven member including a drum having a friction lining loosely surrounding and spaced from said plate and weights;
   said drum having a radial wall terminating in an axial hub adapted to drivingly receive the input shaft of an oil pump;
   said plate hub extending outwardly of said plate;
   said drum hub loosely projected through said plate hub and extending to its outer end;
   said plate hub extending axially inward of said plate into registry with a stop shoulder on said drum hub;
   and a plug frictionally projected into and anchored within the end of the drum hub and having an enlarged flange retainingly engaging the plate hub against axial movement relative to the drum hub, said plug closing off the interior of the plate hub, and said plug flange closing off the interior of said drum hub.

6. In the centrifugal clutch of claim 5, splines on and around a portion of the plate hub; and an annular shroud on said plate hub spaced outwardly of said splines; said drive means inclduing an internally splined connector projected into said shroud and over said splines in drive relation.

7. In the centrifugal clutch of claim 6, said drive connector at its other end having an uneven axial aperture adapted to receive a motor-driven shaft.

\* \* \* \* \*